United States Patent [19]
Mesenich

[11] Patent Number: 4,798,329
[45] Date of Patent: Jan. 17, 1989

[54] COMBINED FUEL INJECTOR AND PRESSURE REGULATOR ASSEMBLY

[75] Inventor: Gerhard Mesenich, Bochum, Fed. Rep. of Germany

[73] Assignee: Colt Industries Inc., New York, N.Y.

[21] Appl. No.: 21,231

[22] Filed: Mar. 3, 1987

[51] Int. Cl.[4] .......................... B05B 1/30; B05B 1/14; C11D 9/18; F16K 15/00

[52] U.S. Cl. .......................................... 239/5; 137/536; 239/533.6; 239/585; 251/129.15; 251/129.22

[58] Field of Search ........................ 239/5, 585, 533.6; 251/129.15, 129.18, 129.22; 137/536

[56] References Cited

U.S. PATENT DOCUMENTS 2,205,463 6/1940 Birch .............................. 137/536 X
3,481,542 12/1969 Huber ............................. 239/585 X
4,524,743 6/1985 McAuliffe et al. ............ 239/585 X
4,648,559 3/1987 Fuller ................................ 239/585
4,678,124 7/1987 Hafner et al. ....................... 239/585
4,726,389 2/1988 Minoura et al. ............... 239/585 X

*Primary Examiner*—Andres Kashnikow
*Assistant Examiner*—Patrick N. Burkhart
*Attorney, Agent, or Firm*—Walter Potoroka, Sr.

[57] ABSTRACT

A duty-cycle type electromagnetic injector assembly has a valve and cooperating valve seat with the valve being positioned away from or against the valve seat depending upon whether an associated electrical coil is energized; a housing generally contains the valve and valve seat; a guide closely confines the valve permitting the valve to be freely moved toward and away from the valve seat while constraining movement of the valve in other directions; and a fluid pressure regulator forming a portion of the injector assembly establishes both the static rate and dynamic rate of liquid flow metered by the injector assembly.

18 Claims, 3 Drawing Sheets

COMBINED FUEL INJECTOR AND PRESSURE REGULATOR ASSEMBLY

FILED OF THE INVENTION

This invention relates generally to fuel injection systems and more particularly to injector assemblies whereby fuel is metered and injected into the fuel induction system of an associated combustion engine and still more particularly wherein such an injector assembly comprises a pressure regulator.

BACKGROUND OF THE INVENTION

The automotive industry is continually striving to attain reductions in engine fuel consumption and among the various systems and devices proposed heretofore by the prior art is the use of a duty-cycle type of electromagnetic fuel metering valving assembly. Generally, as is well known in the art, such duty-cycle valving assemblies employ a generally cyclically energized field coil which causes an associated armature-positioned valving member to open and close against a cooperating valve seating surface to intermittently permit and cease fuel flow to the engine. Generally, the average amount of time, within a given span of time, that the valve is opened will determine the then metered rate of fuel flow to the engine.

In such fluid flow metering devices it is important to establish and regulate the pressure of the fluid, in this case fuel, upstream of the cooperating valving member and valve seating surface in order to establish the desired rate of metered fluid flow for a given duty-cycle.

Heretofore, the prior art has, in the production of fuel injection systems and apparatus, separately flow calibrated the fuel injector assembly and separately calibrated the attendant pressure regulator assembly. Often each of such is calibrated with respect to a nominally same magnitude of reference pressure. In any event, in so doing each of the assemblies has its own tolerance to which it is individually calibrated and, as a consequence thereof, the calibrated injector assembly must be subsequently matched to the calibrated pressure regulator assembly or, in the alternative in order to avoid the requirement of matching, the respective initial calibration tolerances of the injector assembly and of the pressure regulator assembly are made somewhat hypercritical. Both of such approaches are not only time consuming but expensive.

The invention as herein disclosed and described is primarily directed to the solution of the aforestated problems of the prior art and to provide structure which is comparatively inexpensive to produce and yet provide the required regulated fuel pressure as to, in turn, provide for accurate metering of the fuel to the associated engine, as well as the solution of other related and attendant problems.

SUMMARY OF THE INVENTION

According to the invention, a valving assembly for metering the rate of flow of a fluid comprises housing means, electrical field coil means carried by said housing means, pole piece means situated generally within said field coil means, valve seat means, fluid flow passage means formed through said valve seat means, said pole piece means comprising a pole piece axial end portion, a valve member situated generally between said pole piece axial end portion and said valve seat means, wherein said valve member also serves as an armature means to be acted upon by the flux field generated by said field coil means when energized, resilient means normally operatively resiliently urging said valve member in a first direction toward operative seating engagement with said valve seat means to thereby terminate flow of said fluid through said fluid flow passage means, wherein said field coil means when energized creates said flux field causing said valve member to move in a second direction opposite to said first direction away from said valve seat means as to thereby permit flow of said fluid through said fluid flow passage means, and fluid pressure regulator means operatively carried by said housing means, wherein the static rate of flow of said fluid through said fluid flow passage means is calibrated by adjustment of said pressure regulator means, and wherein the dynamic rate of flow of said fluid through said fluid flow passage means is calibrated by adjustment of said pressure regulator means.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENTS

Figure 1:
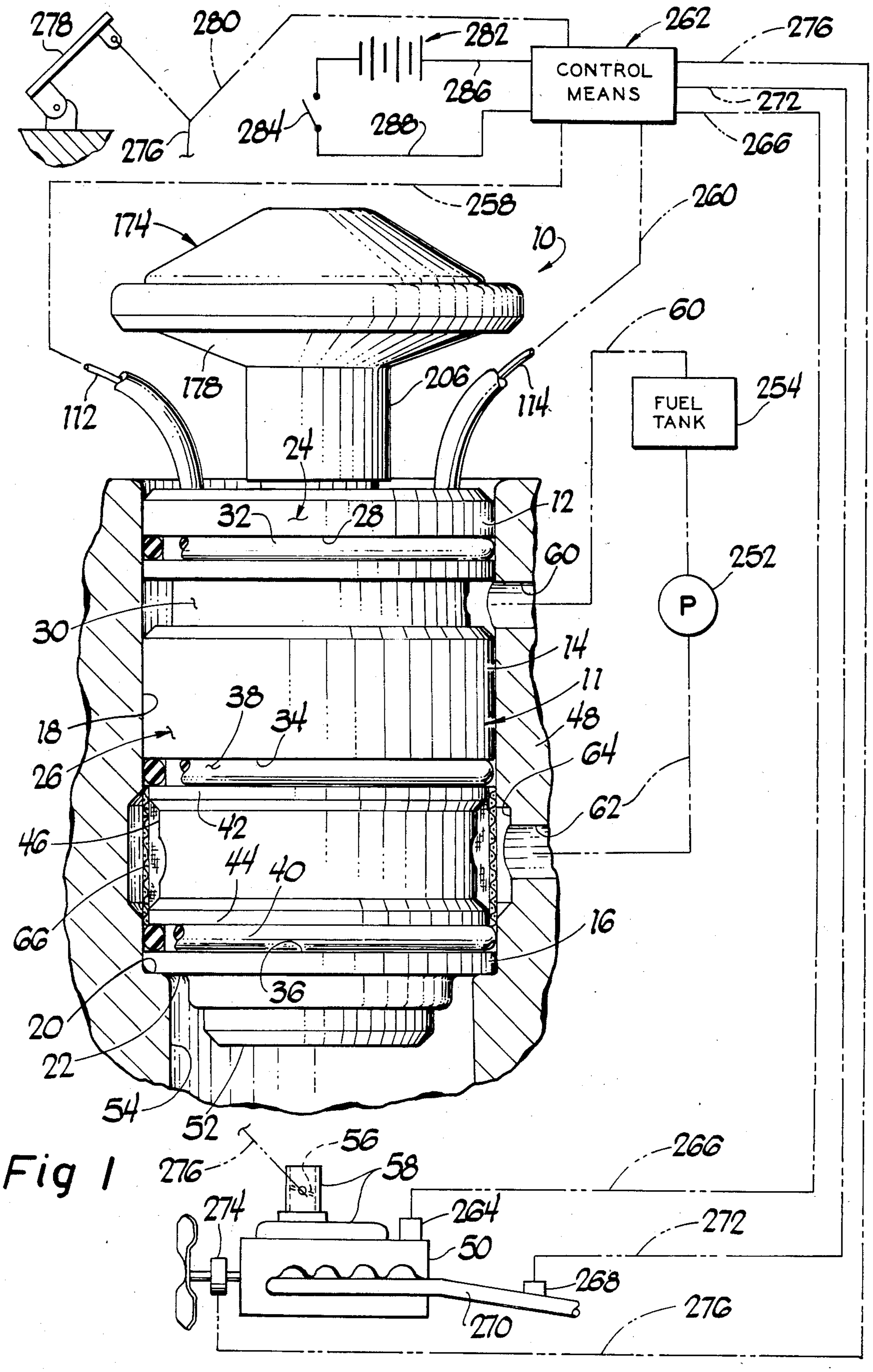
FIG. 1 is an elevational view of an injector assembly, employing teachings of the invention, along with both diagrammatically and schematically illustrated elements and components depicting, in simplified manner, an overall fuel supply and metering system for an associated combustion engine.

Referring now in greater detail to the drawings, FIG. 1 illustrates a generally cylindrical fuel injector assembly 10 with housing or body means 11 having cylindrical outer surface portions 12, 14 and 16 which are closely received with a cooperating cylindrical recess or cavity 18 which may have an inner annular abutment portion 20 against which the end portion 22 of injector assembly 10 may operatively abut. As will become apparent with reference to FIG. 2, the housing or body means 11 may be comprised of separate and operatively interconnected housing or body portions 24 and 26 with housing portion 24 having first and second circumferentially extending recesses 28 and 30 formed therein and wherein recess 28 operatively receives and contains a related O-ring 32 for sealing engagement as between housing portion 24 and the chamber or recess 18. Housing portion 26 is provided with circumferentially extending recesses 34 and 36 respectively operatively receiving and containing O-rings 38 and 40 for sealing engagement as between housing portion 26 and chamber means 18.

Generally axially between grooves or recesses 34 and 36, the body or housing portion 26 may be provided with cylindrical outer surfaces 42 and 44 which may be of a diameter somewhat less than that of surfaces 14 or 16. Further, axially between such surfaces 42 and 44, body or housing portion 26 is preferably provided with a circumferential recess or groove 46.

Generally, the injector assembly 10 is depicted as being received by suitable structure 48 in which the recess 18 is formed. Such structure 48 may be a part of the induction means of the associated engine 50 as to have the discharge end 52 of the injector assembly 10 communicate, as via conduit or passage means 54, with the throttle 56 controlled induction means 58 as either upstream or downstream of the throttle valve means 56. The injector assembly 10 may be axially retained within cavity or recess 18 of structure 48 by any suitable means as, for example, a clamping arrangement (not shown) carried by the structure 48 and urging injector assembly 10 axially toward abutting surface 20.

As depicted in FIG. 1, structure 48 is provided with a passage or conduit 60 which communicates with the annular space defined by the recess 30. A second conduit 62, formed in structure 48, communicates as with a circumscribing groove 64 formed in structure 48 and generally surrounding recessed surface 46. A generally cylindrical filter means 66 is situated as to be held as between surfaces 42 and 44 of injector assembly 10 and the juxtaposed surface of recess or cavity means 18 whereby such filter 66 effectively surrounds the annular space of recess 46.

Figure 2:
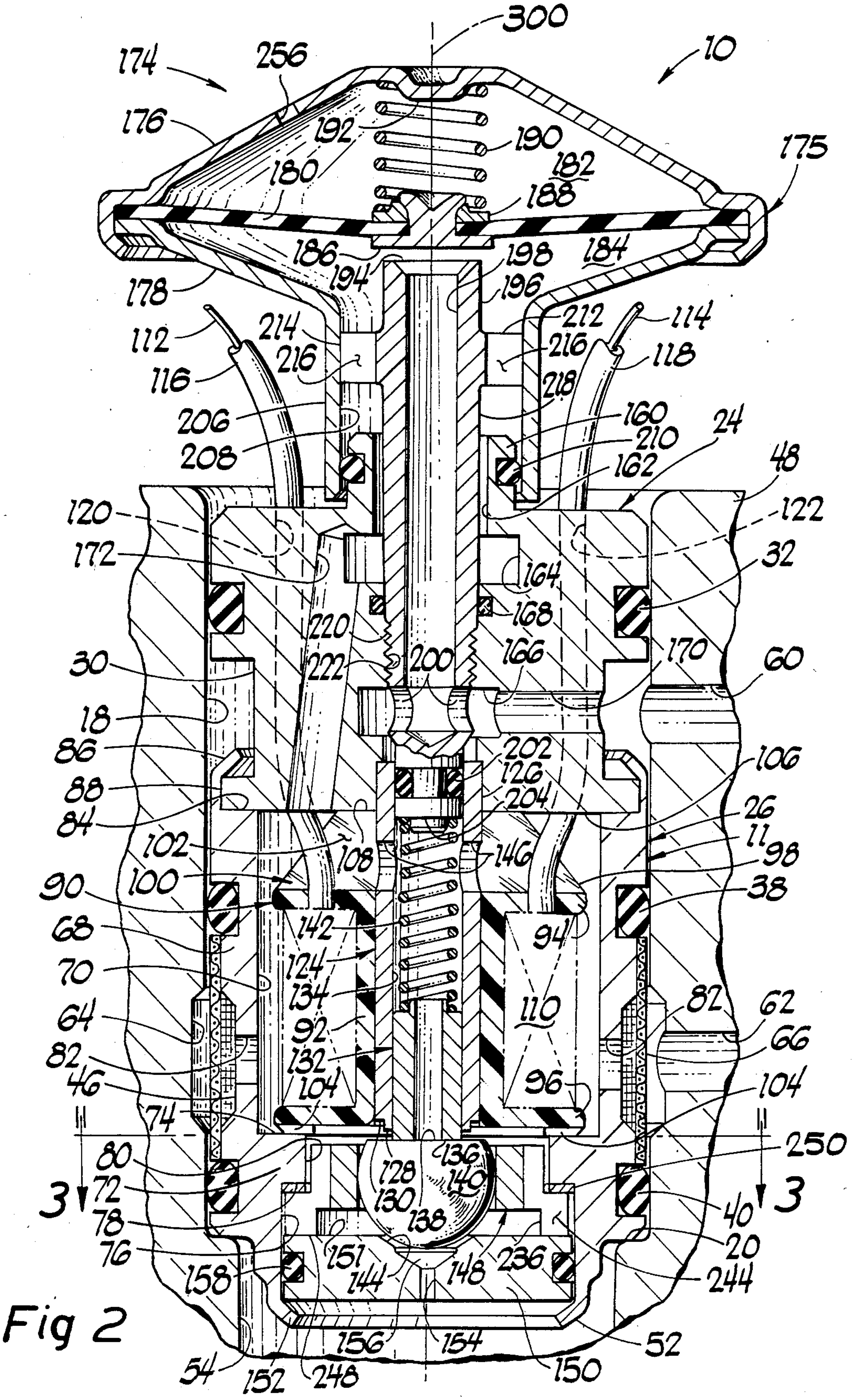
FIG. 2 is an axial cross-sectional view of the injector assembly of FIG. 1.

Referring in greater detail to FIG. 2, the housing or body portion 26 is depicted as being of a generally tubular cylindrical configuration with an annular wall 68 having a generally centrally located relatively enlarged chamber 70 the axial end of which is generally defined by a radially inwardly directed wall or shoulder portion 72 having an upper (as viewed in FIG. 2) disposed abutment surface 74. The lower end (as viewed in FIG. 2) of body portion 26 is provided with a second cylindrical chamber or recess 76 and a lower disposed abutment surface 78, formed as on shoulder portion 72, generally defines the upper axial end thereof. A cylindrical passageway 80 serves to operatively interconnect chambers 70 and 76. A plurality of radially directed passages or conduits 82 are formed through wall 68 and serve to complete communication as between chamber 70 and recess or grove 46 and, through filter means 66, with annular recess or groove 64.

The upper situated housing or body section 24 is also of a generally cylindrical configuration and axially abuts against an annular face 84 of annular wall 68 and is held thereagainst, in fluid sealing engagement, as by having a portion 86, of reduced thickness, of wall 68 formed over a flange-like portion 88 of body 24.

A bobbin 90 is depicted as comprising a centrally disposed tubular portion 92 with axially spaced radially extending end walls 94 and 96 along with an upwardly extending portion 98 which is preferably formed with a diametrically extending slot or clearance 100 the far wall or surface 102 of which is below the plane of the drawing in FIG. 2. In the preferred embodiment a plurality of foot-like portions 104 are carried by the end wall 96 of bobbin 90 and are preferably angularly spaced about the axis of tubular portion 92 and, further, function as abutment means for axially abutting against the upper or end surface 74. When body section 24 is seated and secured against body section 26, end surface 106 of body section 24 abuts against juxtaposed end surface 108 of extension 98 and urges foot-like abutment means 104 into engagement with surface 74. A field coil 110 is wound generally about tubular portion 92 and axially contained between end walls 94 and 96. The ends of wire forming the coil 110 are respectively electrically connected to conductor means 112 and 114 which may be provided with suitable insulating sheathing 116 and 118. As generally depicted, the conductor means 112 and 114 extend through body section 24, as by passing through passages 120 and 122 formed in body section 24. Passages 120 and 122 are suitably sealed as to preclude leakage therethrough. Although the invention is not so limited, body section 24 may be of non-magnetic material.

A generally tubular cylindrical pole piece 124, at its upper end 126, is operatively secured to and carried by body section 24 as to extend downwardly therefrom and be received in the tubular portion 92 of bobbin 90. Preferably, the lower end of the pole piece 124 is formed as to have a stepped annular end face; that is a first annular end face 128 projects axially beyond a radially outer annular face or shoulder 130.

A cylindrical guide pin or means 132, preferably tubular, is slidably received with the central passage 134 of pole piece means 14 as to have its lower end face 136 in abutting contact with a flatted surface 138 of an otherwise spherical valve member 140 which also serves as an armature means. As will become even more apparent, a compression spring 142 situated in passage 134 serves to resiliently urge guide means 132 downwardly, as viewed in FIG. 2, against armature-valve 140 and thereby sealingly seat the armature-valve 140 against coacting valve seating surface means 144. (For purposes of clarity, the valve 140 is shown slightly raised off seating means 144.)

In the preferred embodiment, a plurality of apertures or passages 146 are formed in pole piece means 124 as to complete communication between passage 134 and the space provided by opening 100 and, thereby, communicate with chamber 70.

A valve guide and centering means 148, which may be partially situated in chamber or recess 76 and partially situated in passage or clearance 80 is held in locked operative abutting relationship with shoulder 78 by means of a generally disk-like valve seat member 150 which, in turn, is urged inwardly toward the valve guide 148 as by having housing portion 152 formed-over thereagainst. As generally depicted, a discharge passage (or if desired a plurality of discharge passages) 154 formed through valve seat member 150 communicates with the space 156 immediately below valve 140 so that every time valve 140 is opened fluid passes about valve 140 into space 156 and from there discharged through passage 154 to the intended receiving area. Preferably, an O-ring seal 158 operatively contained by a circumferential groove in valve seat member 150 serves to sealingly preclude any leakage therepast.

The upper situated housing section 24 is preferably provided with a generally cylindrical tubular upward extension 160 having an internal passage 162 which communicates with a chamber 164 in body portion 24. A second chamber 166 formed in housing section 24 and spaced from chamber 164 is suitably fluidly sealed from direct communication with chamber 164 as by an O-ring 168. Chamber 166 communicates with the annulus 30 as via conduit means 170. Additional conduit means 172, formed in housing section 24, communicates as between chambers 70 and 164.

The regulator portion 174 of the overall injector assembly 10 is illustrated as comprising housing means 175 having housing portions 176 and 178 which cooperate with each other to retain, generally peripherally therebetween pressure responsive movable wall or diaphragm means 180 and to at opposite sides thereof define distinct but variable chambers 182 and 184.

Diaphragm means 180 carries a centrally situated valving means 186 suitably secured thereto as by a diaphragm backing plate or member 188. A compression spring 190 piloted at its upper end as about an indentation 192 formed in housing portion 176 extends and operatively engages the backing member 188 as to thereby normally urge valving means 186 downwardly into seated sealing contact with a cooperative seating surface 194 as at the upper end of a member 196. (For purposes of clarity, valve 186 is shown moved to a position open with respect to seating surface 194.)

The member 196 is, for the most part of an axially extending cylindrical configuration and also, for the most part tubular having an axially extending passage or conduit 198 which effectively terminates at its lower end, as viewed in FIG. 2, where it communicates with a plurality of generally radially directed passages or apertures 200 formed in member 196. The lower end of member 196, closely piloted as within the upper portion of passage 134 of pole piece 124, is provided with a circumferential recess operatively containing an O-ring 202 which serves to prevent leakage therepast. The lower end of member 196 is provided with a piloted spring seat portion 204 against which the upper end of spring 142 abuts.

The lower housing portion 178 of the regulator means 174 is provided as with a tubular cylindrical extension portion 206 which, as depicted has a cylindrical inner surface 208 which generally circumscribes extension portion 160 of housing section 24. A circumferential groove formed as in extension 160 operatively contains an O-ring 210 which serves to prevent leakage as between extension 160 and inner surface 208 of depending extension portion 206. In the preferred embodiment the stem-like member 196 is formed with an annular disk-like flange 212 having an outer diameter 214 closely received as by surface 208 and suitably fixedly secured thereto, for example, as by welding. The flange 212, in turn, is formed with a plurality of passages 216 therethrough. The stem-like member 196 has its outer axially extending cylindrical surface 218 of a diameter as to result in a substantial annular clearance as between cylindrical surface 162 and 218. The stem member 196 is also provided with an externally threaded portion 220 which cooperates with an internally threaded portion 222 formed in housing section 24.

Figure 3:
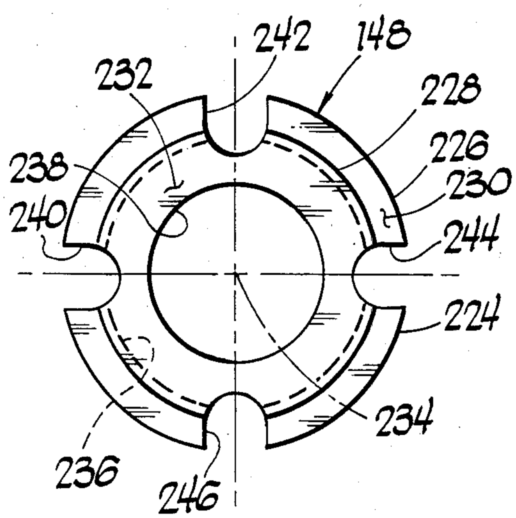
FIG. 3 is a view, taken generally on the plane of line 3—3 of FIG. 2 and looking in the direction of the arrows, illustrating one of the elements in the structure of FIG. 2.

Referring also in greater detail to FIG. 3, the valve guide and locating means 148 is illustrated as comprising a main disk-like body 224 having a first relatively larger outer cylindrical surface 226 and a second generally coaxial relatively smaller outer cylindrical surface 228 between which is an annular shoulder surface 230. A top or upper (as viewed in FIG. 2) surface 232 may be normal to the axis 234.

The valve guide means 148, preferably of magnetic stainless steel, at its lower end has a cylindrical counterbore 236 formed therein. A centrally located axially extending cylindrical passageway 238 extends through body 224 and is effective for receiving the valving member 140 (FIG. 2). In a preferred embodiment, the diameter of the ball valve member 140 may be in the order of 0.2810 inch while the diameter of passageway 238 may be in the order of 0.2815 to 0.2820 inch thereby resulting in a minimal diametrical clearance (between the ball valve 140 and passageway 238) of 0.0005 inch and a maximum diametrical clearance of 0.0010 inch. It is contemplated that in the preferred embodiment the valve member 140 may be comprised of 52100 Grade chrome steel and such are readily commercially available to very exacting dimensional requirements. Further, the guide means 148 has a plurality of slots or passages 240, 242, 244 and 246 formed therein which, as generally depicted in FIG. 2, serve to complete communication as between the area above top surface 232 of guide means 148 and the chamber area formed mainly by lower counterbore 236.

As is well known, the stroke of an armature, in this case armature-valve 140, is the distance that the armature moves as from its seated condition, against valve seat surface 144, to its end of travel, as against pole piece end face 128, upon energization of the coil means 110. Of course, movement in the opposite direction is also equal to such stroke. In the embodiment of FIG. 2, there is no need for the machining of critical dimensions of, for example, the depth or shape of seating surface 144 with respect to the top surface 151 of cylindrical end body 150 nor is there the need for the machining of the axial length from shoulder 230 of guide member 148 to the lower end surface 248 of member 148 in order to obtain a desired armature stroke. What is instead employed is a ring-like shim 250 of gauge-like stock the thickness of which is selected so that when assembled as depicted in FIG. 2 the seat 144 becomes so located as to result in the armature-valve 140 having the desired stroke. Further, it should be mentioned that before portion 52 is rolled-over to lock the elements, the valve 140 is seated against seating surface 144 and the guide means 148, still not frictionally held in place, is permitted to move generally laterally or transversely as to closely contain valve 140 within guide passage 238 and still have valve 140 fully seated (closed) against seating means 144. As generally depicted in FIG. 2 the diameter of cylindrical portion 228 (of guide means 148) is significantly less than the diameter of clearance passageway 80 while the diameter of cylindrical portion 224 (of guide means 148) is significantly less than the diameter of cylindrical chamber 76. Because of such differences in juxtaposed cylindrical surfaces, the guide means 148 is permitted sufficient lateral or transverse movement as to assure the proper seating and guiding of ball valve 140.

Operation of the Invention

With reference to both FIGS. 1 and 2, fuel pump means 252, which may be mounted internally of a fuel tank 254, supplies fuel under superatmospheric pressure via conduit means 62 to annular chamber or recess 64 from where it flows through filter means 66 into annular recess or chamber 46 and through the plurality ports or passages 82 into the interior space of chamber 70.

A portion of such fuel flows between the spaced foot portions 104 of bobbin 90 thereby flooding the space generally between the lower (as viewed in FIG. 2) end of bobbin 90 and the upper surface 232 of valve guide means 148. The fuel then flows through the passages or slots 240, 242, 244 and 246 of valve guide means 148 thereby flooding the space defined by the counterbore 236 (the valve 140 may for ease of discussion be considered fully seated against seating surface means 144 thereby preventing fuel flow through the discharge passage or nozzle means 154).

Another portion of the fuel entering chamber 70 flows through the passages or clearances 100 and via ports 146 into passage 134 filling it as well as filling the interior of guide pin 132.

Still another portion of the fuel entering chamber 70 flows through conduit means 172 into chamber 164, then through passage 162 into the space defined within downwardly extending portion 206 of pressure regulator housing portion 178 and flowing through the passages 216 enters chamber 184.

The fuel thusly entering chamber 184 acts upon the diaphragm means 180 thereby lifting valve 186 off cooperating seat 194 thereby permitting a portion of the fuel to flow through chamber 184 and into passage 198, through ports or passages 200 and into chamber 166 from where the fuel flows via conduit means 170 and into the annular space of recess 30. The fuel flowing into recess 30 is then returned to the upstream side of pump means 252 as by, for example, conduit means 60 leading to the fuel tank 254. The fuel thusly returned to the tank is in effect excess fuel not then needed for metering to the associated engine 50.

As is well known in the art, the pressure regulating valving means 186 is continually undergoing movement in the opening and closing directions, as in a somewhat oscillating manner, to thereby regulate the pressure of the fuel within chamber 184 to a preselected magnitude. Since such fuel within chamber 184 is in direct communication with the fuel in chamber 70 as well as the fuel generally surrounding metering valve 140 all of such fuel becomes regulated to the same preselected magnitude.

Chamber 182 of regulator means 174 may be referenced to any desired reference pressure; however, in the embodiment disclosed chamber 182 is placed in communication with ambient atmospheric pressure as via passage means 256.

As depicted in FIG. 1, the terminal or conductor means 112 and 114 may be respectively electrically connected as via conductor means 258 and 260 to related electronic control means 262 and as should already be apparent, the metering means 10 is of the duty-cycle type wherein the winding or coil means 110 is intermittently energized thereby causing, during such energization, armature valve member 140 to move in a direction away from valve seat 144. Consequently, the effective flow area of the flow orifice thusly cooperatively defined by the armature valve member 140 and valve seat 144 can be variably and controllably determined by controlling the frequency and/or duration of the energization of coil means 110.

The control means 262 may comprise, for example, suitable electronic logic type control and power output means effective to receive one or more parameter type input signals and in response thereto produce related outputs. For example, engine temperature responsive transducer means 264 may provide a signal via transmission means 266 to control means 262 indicative of the engine temperature; sensor means 268 may sense the relative oxygen content of the engine exhaust gases (as within engine exhaust conduit means 270) and provide a signal indicative thereof via transmission means 272 to control means 262; engine speed responsive transducer means 274 may provide a signal indicative of engine speed via transmission means 276 to control means 262 while engine load, as indicated for example by the position of the engine induction system throttle valve 56, may provide a signal as via transmission means 276 operatively connected to the engine operator's foot-actuated throttle pedal lever 278 and operatively connected as by the same transmission means or associated transmission means 280 to control means 262. A source of electrical potential 282 along with related switch means 284 may be electrically connected as by conductor means 286 and 288 to control means 262. The rate of metered fuel flow, in the embodiment disclosed, will be dependent upon the relative percentage of time, during an arbitrary cycle time or elapsed time, that the valve member 140 is relatively close to or seated against seat 144 as compared to the percentage of time that the valve member 140 is opened or away from the cooperating valve seat 144.

This is dependent on the output to coil means 110 from control means 262 which, in turn, is dependent on the various parameter signals received by the control means 262. For example, if the oxygen sensor and transducer means 268 senses the need of a further fuel enrichment in the motive fluid being supplied to the engine and transmits a signal reflective thereof to the control means 262, the control means 262, in turn, will require that the metering valve 140 be opened a greater percentage of time as to provide the necessary increased rate of metered fuel flow. Accordingly, it will be understood that given any selected parameters and/or indicia of engine operation and/or ambient conditions, the control means 262 will respond to the signals generated thereby and respond as by providing appropriate energization and de-energization of coil means 110 (causing corresponding movement of valve member 140) thereby achieving the then required metered rate of fuel flow to the engine 50.

More particularly, assuming that the coil means 110 is in its de-energized state, spring 142 will urge the guide pin 132 (which is axially slidable within core or pole piece means 124) downwardly causing the lower axial end face 136 of the guide pin 132 to urge against the flatted surface 138 of armature valve 140 and hold the valve 140 in a sealed seating engagement with seat means 144 thereby preventing fuel flow therepast into conduit or nozzle 154.

When coil means 110 becomes energized a magnetic flux is generated and such flux path includes armature valve 140 and core or pole piece means 124. As a consequence of such flux field, armature valve 140 is drawn upwardly pushing with it the guide pin 132 against the resilient resistance of spring means 142. Such upward movement of the armature valve 140 continues until the flatted surface 138 of armature valve 140 abuts as against pole piece end face means 128. Such total stroke or travel of valve member 140, from its seated or closed position to its fully opened position against pole piece means 124, 128, may be, for example, in the order of 0.005 inch. It should be clear that during the entire opening stroke as well as during the entire closing stroke, the valve member 140 is guided within and by guide passage 238 of the locator or guide means 148.

When the energization of field coil means 110 is terminated, spring 142, through guide pin 132, moves valve member 140 downwardly through its down stroke until the valve 140 is sealingly seated against cooperating seating surface means 144. Such sealing seating of the valve 140 is assured because of: (a) the previously described alignment of the valve member 140 and guide means 148 during assembly thereof into housing means 11 and (b) the very close clearance as between the valve member 140 and guide surface means 238 of guide means 148. Consequently, in the embodiment disclosed, the valve member 140 would have a minimum available side-ways movement (transverse to the direction of its stroke), relative to guide surface means 238 and valve seat 144, of 0.0005 inch and a maximum available side-ways movement of 0.0010 inch (if the surface 238 of guide means 148 were machined to its maximum diametrical dimension). This, in turn, means that even if the valve member 140, during its down or closing stroke, were to move laterally its maximum permissible amount, it would only be 0.0005 inch out of concentricity with the valve seat 144 when the valve first contacted the valve seat. With such a small degree of eccentricity, it would require the valve 140 to move laterally only 0.0005 inch to achieve full sealing seating engagement with the valve seat 144 and such lateral movement would be assisted by the slope of the valve seat means 144 as the valve still continued some degree of downward movement caused by spring means 142 until full sealing seating engagement was achieved.

The foregoing describes the overall operation of the invention once calibrated. The following describes the calibration of the invention and the inventive means and method of achieving such.

By way of example, let it be assumed that the injector assembly 10 as depicted in FIG. 2 has been assembled but not yet calibrated. Further, let it be assumed that: (a) the support structure 48 of FIG. 2 represents a portion of related test or calibration apparatus; (b) passage or conduit means 62 is operatively connected to the output of associated suitable liquid supply pump means (not shown); (c) first liquid flow meter means (not shown) is situated downstream of the said liquid supply pump means and upstream of, for example, annular recess 46; (d) second liquid flow meter means (not shown) is situated, as in conduit means 60, downstream of annular recess 30; and (e) conductor means 112 and 114 are electrically connected to a source of electrical potential so that selectively the circuit through conductors 112 and 114 may be switched to either a steady closed or open condition, or, switched as to be cyclically opened and closed as by pulse generation simulating duty-cycle operation.

With the foregoing assumptions and the previously described overall operation of the finished injector assembly 10 in mind, the static and dynamic calibration would be generally as follows.

The liquid supply pump means (which would have an output in excess of that which the injector assembly 10 would ever be expected to meter), supplies the desired test or calibration liquid through said first liquid flow meter means to the injector assembly 10 and such liquid flows therethrough, in the manner and paths previously described, with the excess of such test liquid flowing through said second liquid flow meter means and to a suitable receiving area, for example, as that leading to the inlet of said liquid supply pump means.

To calibrate the static flow of the injector assembly 10, the circuit through conductor means 112 and 114 would be switched to a steady closed condition thereby placing coil means in a steady energized condition which, in turn, would cause armature valve 140 to be moved to a fully opened position as by having surface 138 abut against pole piece end face 128. With the armature valve 140 thusly being held fully open the test liquid would not only flow through said second liquid flow meter means but also through the discharge conduit or nozzle means 154. The actual rate of test liquid flow through nozzle means 154 would be the difference between the rate of flow as indicated by said first liquid flow meter means and the rate of flow as indicated by said second liquid flow meter means. Now, assuming that the actual rate of test liquid flow through discharge conduit means 154 is less than desired (some preselected value), housing section 176 (of regulator assembly 174) would be progressively deformed inwardly as to correspondingly increase the load on spring means 190. This, in turn, will cause an increase in the pressure of the test liquid in chambers 184, 70 and 76 thereby increasing the metering pressure differential across discharge passage means 154 and, therefore, increasing the actual rate of test liquid flow through said discharge conduit means 154. The deformation of housing portion 176 and the increasing of the pre-load of spring 190 continues until the actual rate of test liquid flow through discharge conduit means 154 (that being the difference between the flow rate values of said first and second flow rate meter means) is equal to the preselected desired rate of flow. This then establishes the static flow calibration for the injector assembly 10.

It should be mentioned that if, for example, a screw-type threadably adjustable spring seat were to be employed in the regulator assembly 174, the desired increase or decrease of the pre-load on spring 190 (to achieve calibrated static flow) would be accomplished by the selective adjustment of such threadably adjustable spring seat. Further, the test liquid referred to may be any selected liquid or fluid generally simulating the liquid to be actually metered by assembly 10 and may, in fact, be the liquid to be actually metered by assembly 10, during its ultimate use, as for example, fuel. It should also be apparent, that in thusly simultaneously achieving such static calibration of both the pressure regulator means 174 and the nozzle means 154, the overall injector assembly 10 is also set to deliver the maximum rate of liquid flow for the correspondingly established metering pressure differential without particular regard to having to be concerned with the quantitative magnitude of such metering pressure differential. Such becomes even more evident when one considers that in a second injector assembly of the invention, the desired actual rate of metered liquid flow discharged through its discharge passage means 154 may occur at a metering pressure differential greater or less than that employed in the calibrated first injector assembly which, when calibrated, is supplying the same desired actual rate of metered liquid flow discharged through its discharge passage means 154.

To calibrate the dynamic flow of the injector assembly 10, the circuit through conductor means 112 and 114 would be switched to provide for a cyclically pulsed energization of coil means 110 and the frequency and/or duration thereof would be selected to correspond to a signal or operating parameter as would be expected to occur during use of the injector assembly 10. For example, the duty-cycle thusly selected may be that which would be indicative of curb-idle engine operation with the engine already having attained a preselected minimum engine temperature.

As in establishing the static flow calibration, so too, in establishing the dynamic flow calibration the test liquid supply pump means, the first flow rate meter means and second flow rate meter means would similarly be employed.

Therefore, with the test liquid being thusly supplied and a portion of it being returned via said second flow rate meter means, the portion or rate of flow of the test liquid being metered, at such a condition of curb-idle warm engine operation, will also be the difference in rates of flow between said first and second flow rate meter means. Now, assuming that the observed or actual rate of metered liquid flow is greater than that which is preselected as desired, all that needs to be done is to rotate housing means 175 of regulator means 174 about its axis 300 and thereby simultaneously threadably rotating stem or tubular member 196 and causing end 204 of member 196 to move axially downwardly. The downward movement of end 204, in turn, increases the pre-load of spring 142 thereby maintaining the armature valve 140 closed until the flux density (of the field generated by cyclically energized coil 110) increases to a relatively greater magnitude and permitting the spring 142 to start to move armature valve 140 toward its closed seated condition (against seating surface means 144) at a flux density relatively greater than otherwise effected with a lower spring pre-load of spring means 142. Such axially inward rotation of the regulator means 174 continues until it is determined (by the difference between the observed rates of flow indicated by said first and second flow sensor means) that the actual rate of metered liquid flow through said nozzle or conduit means 154 (during such dynamic flow) corresponds to the preselected desired rate of metered liquid flow for the then preselected condition of dynamic flow. Of course, if the initial actual rate of dynamic metered fuel flow through nozzle means 154 were less than the preselected desired rate, for the said preselected condition of dynamic flow, the regulator assembly 10 would be rotated in the opposite direction (reducing the pre-load of spring 142) until the desired rate of metered liquid flow was attained. In any event, the then position of the fully adjusted regulator assembly 174 may be locked against further unauthorized rotation by any suitable means such as, for example, suitable clamping means as between body means 11 and housing means 175 or welding as between housing section means 178 and housing portion 24.

In view of the foregoing it should be apparent that the various otherwise possibly critical dimensions of the injector which would otherwise be at least a contributing factor to the rate of metered liquid flow by the injector assembly 10, for at least the most part, can be either dispensed with or at least substantially increased in their tolerances and that the need for separately very accurately calibrating a pressure regulator and separately very accurately calibrating a metering assembly (and then even possibly matching a calibrated regulator to a calibrated metering assembly) is eliminated because the injector assembly of the invention and the calibration thereof automatically compensate for all of such variations and such resides in only the final determination of the static and dynamic flow regardless of dimensional and other variations as between successive injector assemblies.

Figure 4:
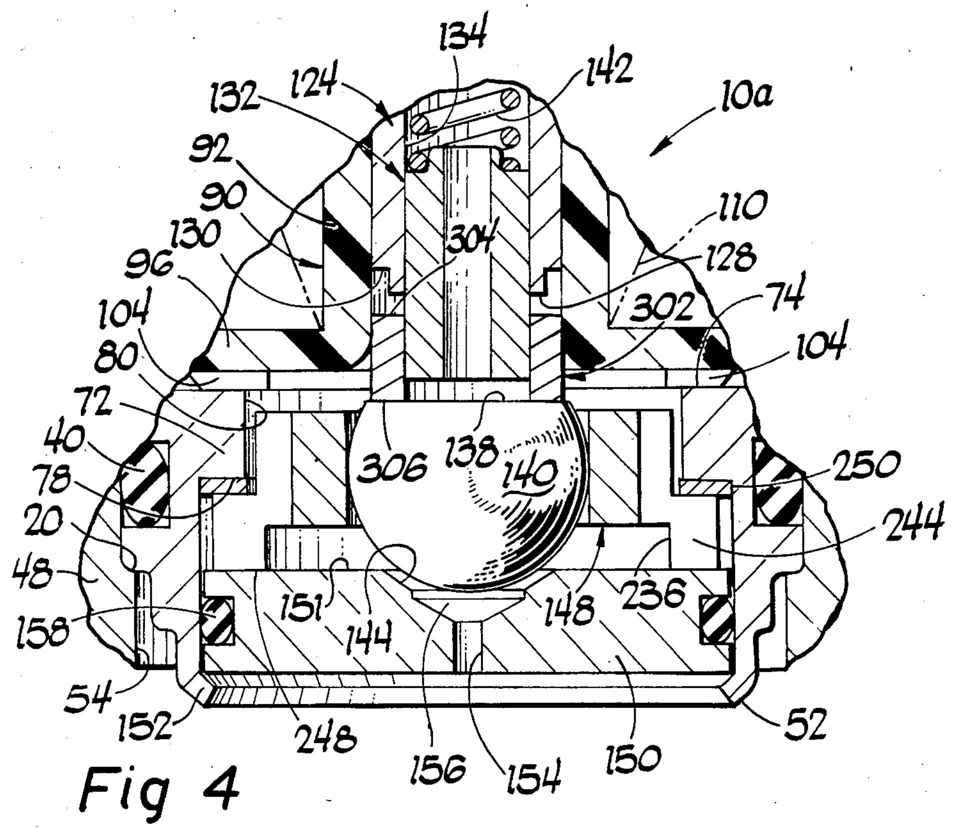
FIG. 4 is a fragmentary axial cross-sectional view of structure similar to that of FIG. 2 but illustrating a modification thereof and FIG. 5 is a view, in comparatively reduced scale, of another embodiment of the injector assembly as shown in any of FIGS. 1, 2 or 4.

In FIG. 4 all elements of injector assembly **10*a* shown which are like or similar to those of injector assembly 10 of FIG. 2 are identified with like reference numbers; all other details and/or elements not specifically shown in FIG. 4 may be considered to be as depicted in FIG. 2**.

In the embodiment of FIG. 4 the guide means or member 132 is illustrated as being provided with a cylindrically tubular member 302, of magnetic material, suitably secured to guide member 132, as by being, for example, press-fitted thereon, so as to be axially movable in unison with guide means 132. The upper 304 and lower 306 (as viewed in FIG. 4) axial end surfaces are preferably: (a) normal to the axial motion of guide means 132 and parallel to the annular axial end face 128 of pole piece means 124. In the embodiment of FIG. 4, the tubular or shoe-like member 302 also serves as an armature means so that a portion of the force necessary to overcome the pre-load of spring 142 is developed through the magnetic shoe means 302 and the remaining portion of the force, preferably primarily the force of moving the armature valve 140, is developed through the magnetic armature valve 140 itself each, of course, upon energization of coil means 110. The calibration and operation of the injector assembly **10*a* would otherwise be the same as described with reference to injector assembly 10 FIGS. 1, 2 and 3**.

Figure 5:
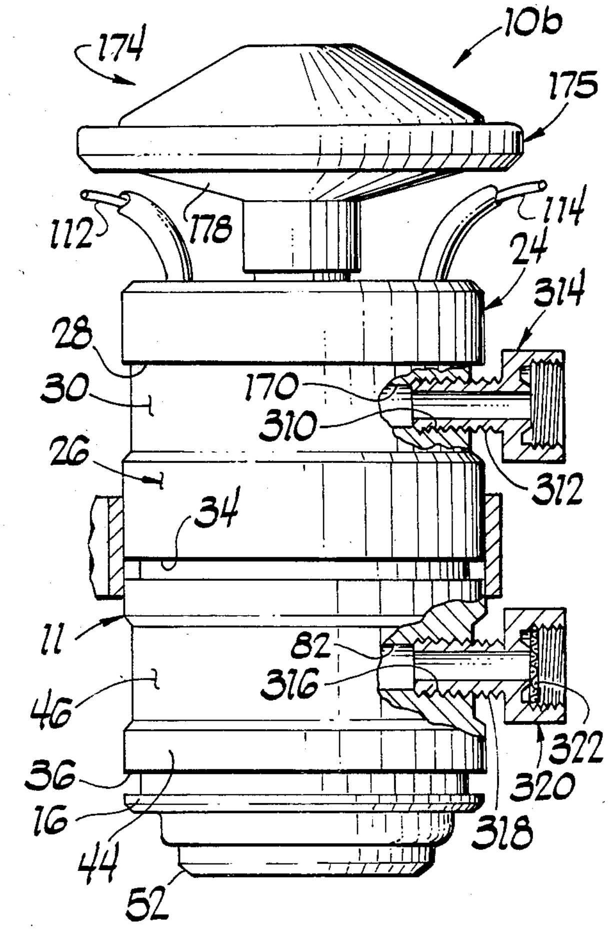

FIG. 5 illustrates, mainly in elevation, another aspect or embodiment of the invention. For purposes of disclosure, it may be assumed, except as hereinafter noted to the contrary, that all of the details and/or elements of the injector assembly **10*b* are as disclosed in either of FIGS. 2 or 4; further, all elements of the injector assembly 10*b*** which are shown and which are like or similar to any of the preceding Figures are identified with like reference numbers.

The embodiment of FIG. 5 contemplates that conduit or passage means 170 may be provided with a threaded portion 310 which may then coact with the threaded portion 312 of a suitable coupling means 314 and, similarly, that at least one of the passages or conduits 82 would be provided with a threaded portion 316 which would coact with the threaded portion 318 of a second suitable coupling means 320. If the injector assembly **10*b* were to have a plurality of passages or conduits 82, it is contemplated, in the preferred embodiment thereof, that each of such plurality of passages 82 would be provided with a threaded portion 316 and that all, except one of such passages 82**, would be closed as by a cooperating threaded plug-like member.

The coupler means 314 would, in turn, be operatively connected to return conduit means as generally depicted at 60 of FIG. 1 while coupler means 320 would be operatively connected to supply conduit means as also generally depicted at 62 of FIG. 1. Suitable inlet filter means 322 may be provided within coupler means 320.

Because of the manner in which the housing means 11 is internally sealed against leakage it becomes possible to employ the injector assembly as depicted by **10*b* in a manner whereby the entire assembly 10*b* may be fixedly supported in any selected convenient location as by simple support, clamping means or strap means as fragmentarily depicted at 324 without the need for having the injector assembly 10*b* carried as within outer housing support means as fragmentarily depicted at 48 of FIGS. 1 and 2**.

The teachings of the invention also result in additional benefits in that a significantly more favorable hydraulic behavior of the injection system is attained enhancing the linearity and the linear range of the injector assembly by the substantial reduction of otherwise usually present low frequency hydraulic pressure waves in the liquid of the injector assembly system.

The invention as disclosed herein may be employed in fuel systems which are commonly referred to as single point injection systems wherein an injector assembly (or injector assemblies) is employed for injecting fuel into the total air stream being supplied to the engine; the invention may also be employed in fuel systems which are commonly referred to as port injection systems wherein a plurality of injector assemblies are provided to respectively supply metered fuel to corresponding respective engine cylinders thereby providing a metered rate of fuel which is sufficient only for the demands of such respective engine cylinder; and the invention may be employed in a fuel system wherein a single injector assembly serves to simultaneously meter fuel individually to a plurality of engine cylinders.

Further, as should also be apparent, the invention as herein disclosed may be employed for the metering of fluids other than fuel and, of course, is not necessarily limited in use to an engine fuel system.

Although only a preferred embodiment and selected modifications of the invention have been disclosed and described, it is apparent that other embodiments and modifications of the invention are possible within the scope of the appended claims.

What is claimed is:

1. A unitary valving assembly for metering the rate of flow of a fluid, comprising housing means, electrical field coil means carried by said housing means, pole piece means situated generally within said field coil means, valve seat means, fluid flow passage means formed through said valve seat means, said pole piece means comprising a pole piece axial end portion, a valve member situated generally between said pole piece axial end portion and said valve seat means, resilient means normally operatively resiliently urging said valve member in a first direction toward operative seating engagement with said valve seat means to thereby terminate flow of said fluid through said fluid flow passage means, wherein said field coil means when energized creates a flux field causing said valve member to be moved in a second direction opposite to said first direction away from said valve seat means as to thereby permit flow of said fluid through said fluid flow passage means, and fluid pressure regulator means operatively carried by and connected directly to said housing means, said operative direct connection being constructed and arranged to enable the static rate of flow said fluid through said fluid flow passage means to be calibrated by a first adjustment of said pressure regulator means, and the dynamic rate of flow of said fluid through said fluid flow passage means to be calibrated by a second different adjustment of said pressure regulator means.

2. A valving assembly according to claim 1 wherein said first and second directions are substantially aligned with each other, wherein the alignment of said first and second directions determines a major axis of said valving assembly, and wherein said pressure regulator means is in substantial alignment with said major axis.

3. A valving assembly according to claim 1 wherein said resilient means comprises first spring means, wherein said regulator means comprises second spring means the pre-load of which is selectively adjustable in order to calibrate said static rate of-flow, and wherein said pressure regulator means further comprises axially adjustable spring seat means for selectively adjusting the pre-load of said first spring means.

4. A valving assembly according to claim 3 wherein said first and second directions are substantially aligned with each other, wherein the alignment of said first and second directions determines a major axis of said valving assembly, and wherein said pressure regulator means is in substantial alignment with said major axis.

5. A valving assembly according to claim 3 wherein said pressure regulator means comprises first and second pressure chamber means, wherein said second chamber means is in communication with a reference pressure, wherein said first chamber means is in communication with the pressure of said fluid upstream of said fluid flow passage means, wherein said second spring means is at least partly received in said second chamber means, and wherein said axially adjustable spring seat means is axially adjustable by threadable rotation of said spring seat means through rotation of said first and second pressure chamber means.

6. A valving assembly according to claim 5 wherein said first and second directions are substantially aligned with each other, wherein the alignment of said first and second directions determines a major axis of said valving assembly, and wherein said rotation of said first and second pressure chamber means occurs centrally about said major axis.

7. A valving assembly according to claim 1 wherein said pressure regulator means comprises regulator body means, pressure responsive movable wall means operatively carried by said body means, pressure regulating valve means positionable by said movable wall means, a first side of said pressure responsive movable wall means being exposed to a reference pressure, inlet means for admitting said fluid to said housing means, additional passage means for communicating a portion of said fluid in said housing means to said body means as to thereby be applied to a second side of said movable wall means opposite to said first side of said movable wall means, wherein said resilient means comprises spring means, wherein said first and second directions are substantially aligned with each other, wherein the substantial alignment of said first and second directions determines a major axis of said valving assembly, spring seat means operatively engaging said spring means and axially adjustable generally along said major axis to selectively increase or decrease the pre-load of said spring means, further passage means formed in said spring seat means and having a second inlet for returning a portion of said fluid from said body means to a receiving area externally of said valving assembly, wherein said pressure regulating valve means coacts with said second inlet for controlling the amount of said fluid that flows from said body means into said additional passage means, and wherein said body means is operatively connected to said spring seat means for movement in unison therewith during axial adjustment thereof.

8. A valving assembly according to claim 7 wherein said axial adjustment of said spring seat means is accomplished by a threadably determined helical rotation of said regulator body means.

9. A valving assembly according to claim 7 wherein said axial adjustment of said spring seat means is accomplished through threadable engagement between said spring seat means and said housing means.

10. A valving assembly according to claim 7 wherein said valve member also serves as an armature means to be acted upon by said flux field generated by said field coil means.

11. A valving assembly according to claim 1 wherein said housing means comprises inlet means for the admission thereto of said fluid from associated externally situated fluid supply means, outlet means for returning to an associated externally situated sump that portion of said fluid admitted to said housing means which is in excess of that required to be metered through said fluid flow passage means, wherein said inlet means comprises means for direct mechanical connection of conduit means to said fluid supply means, and wherein said outlet means comprises means for direct mechanical connection of conduit means to said sump.

12. A unitary duty-cycle type injector assembly having a valving member and cooperating valve seating means formed about fuel discharge passage means wherein said valving member is positioned away from said valve seating means thereby permitting fuel to flow through said fuel discharge passage means upon the energization of associated field coil means and wherein said valving member is positioned in a seated condition against said valve seating means by associated spring means upon de-energization of said field coil means, to thereby terminate the flow of fuel through said fuel discharge passage means, comprising housing means for the containment of said valving member and said valve seating means, and pressure regulator means operatively connected to said housing means so as to be carried thereby, said operative connection being constructed and arranged so that the static rate of flow and said fuel through said fuel discharge passage means is calibrated by adjustment of said pressure regulator means when said field coil means is maintained in a steady energized state, and wherein the dynamic rate of flow of said fuel through said fuel discharge passage means is calibrated by adjustment of said pressure regulator means when said field coil means is made to undergo cyclic energization and de-energization.

13. A method of calibrating a unitary duty-cycle type valving assembly having housing means containing a valve member intended to at times be cyclically seated by associated spring means against a cooperating valve seat to thereby terminate fluid flow therepast and at other times be cyclically moved away from said cooperating valve seat to thereby permit fluid flow therepast, and a pressure regulator operatively connected to and carried by said housing means, said method comprising the steps of (a) establishing the stroke of said valve member from its fully seated condition against said valve seat to its fully opened condition away from said valve seat, (b) causing said valve member to be moved to its fully opened position and maintaining said valve member in said fully opened position while adjusting said pressure regulator to attain a metering pressure differential sufficient to achieve a desired static rate of flow of said fluid past and valve seat and (c) causing said valve member to be oscillatingly moved to and from its fully opened and fully seated conditions while adjusting said pressure regulator to attain a pre-load of said spring means sufficient to achieve a desired dynamic rate of flow of said fluid past said valve seat.

14. A valving assembly for metering the rate of flow of a fluid, comprising housing means, electrical field coil means carried by said housing means, pole piece means situated generally within said field coil means, valve seat means, fluid flow passage means formed through said valve seat means, said pole piece means comprising a pole piece axial end portion, a valve member situated generally between said pole piece axial end portion and said valve seat means, resilient means normally operatively resiliently urging said valve member in a first direction toward operative seating engagement with said valve seat means to thereby terminate flow of said fluid through said fluid flow passage means, wherein said field coil means when energized creates a flux field causing said valve member to be moved in a second direction opposite to said first direction away from said valve seat means as to thereby permit flow of said fluid through said fluid flow passage means, and fluid pressure regulator means operatively carried by said housing means, said pressure regulator means comprising regulator body means, pressure responsive movable wall means operatively carried by said body means, pressure regulating valve means positionable by said movable wall means, a first side of said pressure responsive movable wall means being exposed to a reference pressure, inlet means for admitting said fluid to said housing means for admitting said fluid in said housing means to said body means as to thereby be applied to a second side of said movable wall means opposite to said first side of said movable wall means, said resilient means comprises spring means, said first and second directions being substantially aligned with each other, said substantial alignment of said first and second directions determining a major axis of said valving assembly, spring seat means operatively engaging said spring means and axially adjustable generally along said major axis to selectively increase or decrease the pre-load of said spring means, further passage means formed in said spring seat means and having a second inlet for returning a portion of said fluid from said body means to a receiving area externally of said valving assembly, said pressure regulating valve means coacting with said second inlet for controlling the amount of said fluid that flows from said body means into said additional passage means, and said body means being operatively connected to said spring seat means for movement in unison therewith during axial adjustment thereof, said valving assembly further comprising valve guide means axially slidable relative to said pole piece means in both said first and second directions, cylindrically tubular first armature means carried by said valve guide means as to move in unison therewith and be acted upon by said flux field generated by said field coil means, said valve member operatively abuting against said tubular first armature means, said valve member also serving as a second armature means to be acted upon by said flux field generated by said field coil means, said valving assembly being constructed and arranged so that the static rate of flow of said fluid through said fluid flow passage means is calibrated by adjustment of said pressure regulator means, and so that the dynamic rate of flow of said fluid through said fluid flow passage means is calibrated by adjustment of said pressure regulator means.

15. A valving assembly for metering the rate of flow of a fluid, comprising housing means, electrical field coil means carried by said housing means, pole piece means situated generally within said field coil means, valve seat means, fluid flow passage means formed through said valve seat means, said pole piece means comprising a pole piece axial end portion, a valve member situated generally between said pole piece axial end portion and said valve seat means, resilient means normally operatively resiliently urging said valve member in a first direction toward operative seating engagement with said valve seat means to flow passage means, wherein said field coil means when energized creates a flux field causing said valve member to be moved in a second direction opposite to said first direction away from said valve seat means as to thereby permit flow of said fluid through said fluid flow passage means, and fluid pressure regulator structure means operatively carried by said housing means, said pressure regulator structure means comprising pressure responsive movable valving means being adjustable for establishing a desired rate of flow therepast for a given pressure differential and a selectively displaceable portion for resiliently biasing said valve member toward said valve seat, wherein the static rate of flow of said fluid through said fluid flow passage means is calibrated by adjustment of said pressure regulator structure means and the dynamic rate of flow of said fluid through said fluid flow passage means is calibrated by adjustment of said pressure regulator structure means.

16. A valving assembly for metering the rate of flow of a fluid, comprising housing means, electrical field coil means carried by said housing means, pole piece means situated generally within said field coil means, valve seat means, fluid flow passage means formed through said valve seat means, said pole piece means comprising a pole piece axial end portion, a valve member situated generally between said pole piece axial end portion and said valve seat means, resilient means normally operatively resiliently urging said valve member in a first direction toward operative seating engagement with said valve seat means to thereby terminate flow of said fluid through said fluid flow passage means, wherein said field coil means when energized creates a flux field causing said valve member to be moved in a second direction opposite to said first direction away from said fluid through said fluid flow passage means, and fluid pressure regulator means operatively connected to said housing means, said operative connection being constructed and arranged to enable the static rate of flow of said fluid through said fluid flow passage means to be calibrated by axial adjustment of said pressure regulator means with respect to said housing means and the dynamic rate of flow of said fluid through said fluid flow passage means to be calibrated by rotational adjustment of said pressure regulator means with respect to said housing means, said adjustment being made and fixed during production of said valving assembly and resulting in more uniform performance from assembly to assembly.

17. An integral injector/pressure regulator assembly for metering the rate of flow of a fluid from said injector, said assembly comprising a fuel injector position means having a flow passage including a valve/valve seat means and means for controlling the opening and closing of said valve/valve seat means to control flow of fluid therethrough and pressure regulator portion having means for controlling the pressure of said fluid operatively connected directly to said fuel injector portion, said injector means and said pressure regulator means being both generally annular and being connected so as to have a common axis, said operative connection being constructed and arranged so that calibration of static fluid flow through said flow passage is accomplished by axial adjustment of said pressure regulator portion with respect to said injector portion and so that calibration of dynamic fluid flow through said flow passage is accomplished by rotation adjustment of said regulator portion with respect to said injector portion.

18. A duty-cycle type electromagnetic injector assembly, comprising a housing, a valve having an electrical coil therein, and cooperating valve seat within said housing, said valve being positioned away from or against the valve seat depending upon whether said electrical coil is energized, and a fluid pressure regulator forming a portion of said injector assembly in a manner to enable establishment, by separate adjustments of said pressure regulator with respect to said housing, the static and the dynamic rates of liquid flow metered by said injector assembly.

* * * * *